United States Patent
Giacobbe

[11] Patent Number: 5,935,531
[45] Date of Patent: Aug. 10, 1999

[54] CATALYTIC REACTOR FOR ENDOTHERMIC REACTIONS

[75] Inventor: Francesco Giacobbe, Rome, Italy

[73] Assignee: Mannesmann Aktiengesellschaft, Düsseldorf, Germany

[21] Appl. No.: 08/628,743

[22] PCT Filed: Oct. 26, 1994

[86] PCT No.: PCT/DE94/01293
§ 371 Date: Apr. 9, 1996
§ 102(e) Date: Apr. 9, 1996

[87] PCT Pub. No.: WO95/11745
PCT Pub. Date: May 4, 1995

[30] Foreign Application Priority Data

Oct. 29, 1993 [IT] Italy ............................. RM93A09719

[51] Int. Cl.[6] .................. B01J 8/06; C01B 3/38
[52] U.S. Cl. .............. 422/197; 422/171; 422/177; 422/198; 422/204; 422/205
[58] Field of Search ............ 422/171, 173, 422/177, 197–198, 201, 202, 204–205, 193; 431/353; 165/142, 159

[56] References Cited

U.S. PATENT DOCUMENTS

| 4,999,089 | 3/1991 | Nakase et al. | 422/197 |
| 5,162,104 | 11/1992 | Bezzeccheri et al. | 422/201 |
| 5,219,535 | 6/1993 | Giacobbe et al. | 422/197 |
| 5,429,809 | 7/1995 | Stahl et al. | 422/197 |

*Primary Examiner*—Hien Tran
*Attorney, Agent, or Firm*—Cohen, Pontani, Lieberman & Pavane

[57] ABSTRACT

A catalytic reactor for endothermic reactions, having a catalyst located in a housing which is formed of refractory material, and at least one tubular catalytic vessel arranged in the interior of the housing. A plurality of catalytic vessels are arranged at a distance from one another in the housing, and a plurality of burners are arranged in the housing in such a way that the catalytic vessels lie between the burners. The flame region of the burners lies in the region of the heat distributors in each instance so as to ensure non-adiabatic combustion.

15 Claims, 5 Drawing Sheets

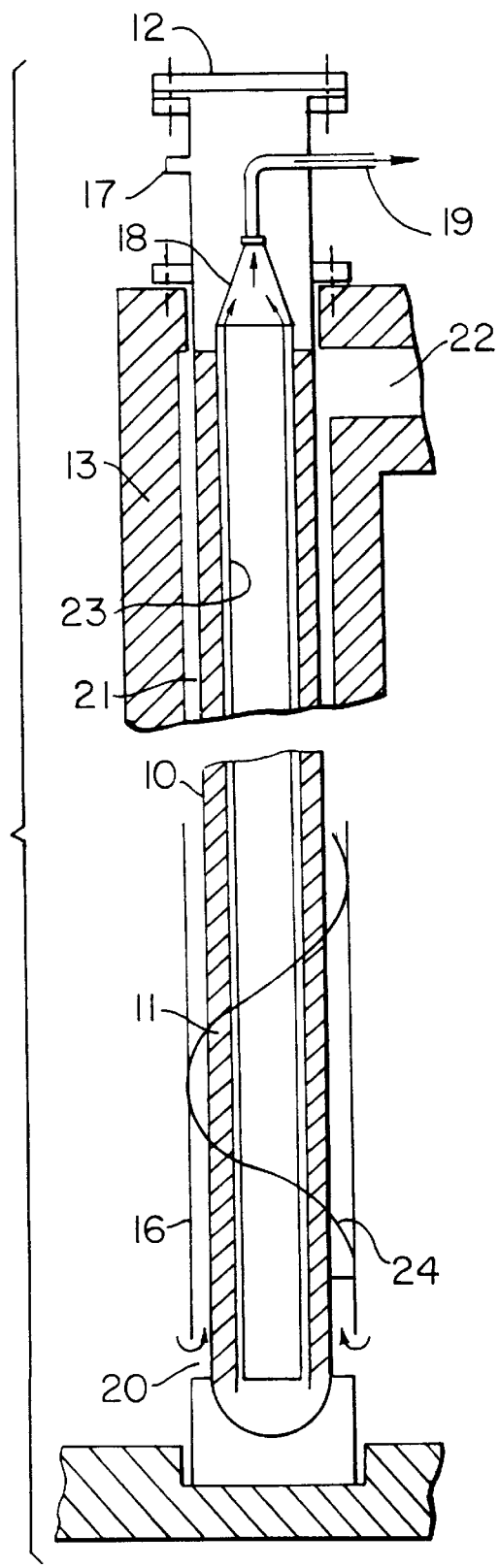
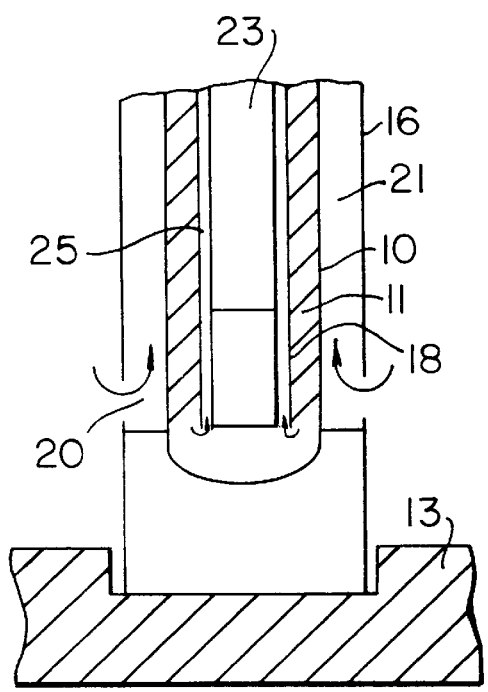
FIG. 4
FIG. 4a

CATALYTIC REACTOR FOR ENDOTHERMIC REACTIONS

BACKGROUND OF THE INVENTION

1. Field of the Invention

The invention is directed to a catalytic reactor. For endothermic reactions. Examples of such reactions are the production of hydrogen by steam reformation of hydrocarbons and dehydrogenation processes that are carried out, e.g., for the production of styrene from ethylbenzene or of propylene from isobutane.

2. Description of the Prior Art

A catalytic reactor having an external cylindrical shape and a reaction chamber with a circular cross section is known from EP 0 380 192 B1. The input material to be catalyzed is introduced from the bottom into the reaction chamber which is filled with a catalytic material, while the obtained catalytically converted product is extracted from the upper end of the reaction chamber. This known reactor is heatable by means of a burner which is arranged below the base level of the reaction chamber and enclosed in the region of its combustion zone by a refractory shell. The flame direction of the burner is oriented coaxially to the longitudinal direction of the reaction chamber. The ascending combustion gases of the burner are guided along virtually the entire length of the reaction chamber in a heat distributor which is formed as a tubular body from a material with good heat conduction and directly adjoins the refractory combustion chamber wall. An annular gap remains open between the tubular heat distributor and the inner defining wall of the annular reaction chamber. The occurring hot combustion gases are therefore first guided upward by the heat distributor and are deflected into the annular gap at the upper end of the heat distributor. The combustion gases then flow downward through the annular gap and, in so doing, give off heat into the reaction space through the inner defining wall. At the same time, however, the combustion gases flowing downward past the wall of the heat distributor also absorb heat from the hot combustion gases flowing upward in the interior of the heat distributor so that the temperature of the gases in the annular gap remains virtually constant. In this way, the known device can be operated as an isothermal reactor in practice.

In another embodiment form, the reactor known from EP 0 380 192 B1 has a plurality of parallel heat distributors arranged in place of a central heat distributor. There is also only one burner provided in this device, this burner being arranged with its combustion space below the base level of the reaction chamber. Since practically no heat is given off externally in the combustion space itself, the combustion of the fuel used in each case takes place under adiabatic conditions so that, depending on the fuel, undesirably high flame temperatures are reached. In order to decrease the temperature of the combustion gases, the conventional amount of approximately 10% excess air can be considerably increased, e.g., to 50%. However, this leads to a compulsory corresponding increase in the amount of exhaust gas with the consequent heat losses, which is also undesirable. As an alternative to a reduction in temperature, EP 0 380 192 B1 proposes a return of exhaust gas to the combustion zone. This has the particular disadvantage of additional construction costs.

Another endothermic reactor is known from EP 0 369 556 B1. The reaction chamber of this reactor, which is filled with a catalyst, is designed as a tubular shell or sheathing tube which is closed at the bottom end. An ascending pipe is inserted into the latter in such a way that the material to be processed can flow in opposite directions through the annular space between the sheathing pipe and the ascending pipe, on the one hand, and through the ascending pipe, on the other hand, in order to pass the reaction space. In this apparatus, the hot combustion gas for heating the reaction space is generated in a separate part of the installation under adiabatic conditions and is subsequently introduced laterally into the refractory housing in the lower end region of the reaction space, this housing enclosing the reactor externally at a distance. In order to prevent hot combustion gas from striking the wall of the reaction space directly and causing damage as a result of the high temperature, the combustion gas is fed in the housing in such a way that the hot gases first strike a tubular barrier of refractory material, are deflected upward, and guided down again from the upper end of the refractory barrier along a second tubular barrier formed of a material with good heat conducting properties. The combustion gas can only flow up again at the bottom end of the second barrier and come into a heat-exchanging contact with the wall of the reaction space. At the same time, heat transfer takes place between the combustion gases flowing in opposite directions through the heat conducting wall of the second barrier. As in the device known from EP 0 380 192 B1, these steps bring about an appreciable reduction in the temperature of the combustion gas so that the wall of the reaction chamber is protected from impermissible thermal loading. The reaction space of this reactor is limited to a single reactor vessel so that the reactor vessels in installations having different output capacities must be provided with new dimensions as appropriate. Further, it is disadvantageous that the barriers which are exposed to high temperatures have closing or sealing parts which must be exchanged after a certain period of operation.

SUMMARY OF THE INVENTION

The object of the present invention is to improve a catalytic reactor for endothermic reactions of the type mentioned above so that the reactor vessel is protected against thermal damage without the drawbacks of costly construction steps, unwanted increases in exhaust gas quantities or disadvantages in the utilization of energy of the fuels employed.

Pursuant to this object, one aspect of the present invention resides in a catalytic reactor having a housing formed of a refractory material and defining an interior that is heatable by hot combustion gases. A flue gas outlet line is connected to the housing to guide the combustion gases therefrom. A plurality of tubular catalytic vessels are arranged at a distance from one another within the interior of the housing and a catalytic material is arranged within the catalytic vessels. A process gas feed line is connected to the catalytic vessels to feed in material which is to be catalytically processed. A product gas outlet line is connected to the catalytic vessels to guide out a product formed by catalytic reaction of the fed in material. A plurality of tubular heat distributors are provided so that one of the heat distributors is assigned to each catalytic vessel and encloses the catalytic vessel over at least a portion of its axial length so as to form a narrow annular gap between the heat distributor and catalytic vessel. The narrowing or gap forms a passage for the hot combustion gases. Additionally, a plurality of burners are arranged in the housing so that the catalytic vessels are situated between the burners. Each of the burners has a flame region in the vicinity of the heat distributors so as to ensure non-adiabatic combustion.

In another embodiment of the invention the catalytic vessels are arranged vertically and substantially parallel to one another so that directly adjacent catalytic vessels are spaced equidistantly. Furthermore, the burners are arranged symmetrically with respect to the catalytic vessels.

Still another embodiment of the invention provides the catalytic vessels to be arranged so that longitudinal axes thereof lie in a common plane. The burners are arranged adjacent to one another in two rows in a mirror-symmetrical manner with respect to the plane of the longitudinal axes of the catalytic vessels.

Yet another embodiment of the invention provides the burners arranged to have a vertical flame direction, preferably downwardly directed.

In an additional embodiment of the invention the catalytic vessels are sealed at their bottom end by a base. An ascending pipe is provided for each catalytic vessel and is arranged within the vessel coaxially to the longitudinal axis of the vessel and substantially along the entire length of the vessel so as to end at a slight distance from the base to form a through-gap. The ascending pipe forms an annular space between the ascending pipe and the outer wall of the catalytic vessel. The catalytic material is arranged within the annular space.

In a further embodiment of the invention the catalytic vessels and the heat distributors are connected to an upper part of the housing so as to be freely suspended so that lower ends of the catalytic vessels and heat distributors are at a distance from the bottom of the housing so that longitudinal thermal expansion can take place while maintaining the entrance gap for the combustion gases open.

The essential aspect of the invention consists is in that the combustion is carried out under nonadiabatic conditions, that is, heat is already guided out of the flame zone during combustion so that the maximum flame temperature which occurs is substantially decreased. This is achieved by providing not only a plurality of burners, but also a plurality of catalytic vessels which penetrate into the flame space of the burners. The catalytic vessels are enclosed within the region of the flame space in each instance by a barrier which will be referred to hereinafter as a heat distributor, since it is formed of a material with good heat conduction and absorbs the heat and distributes it again in the most uniform manner possible. The catalytic vessels are arranged between the burners, respectively.

The invention is explained more fully in the following with reference to the embodiment examples shown in the drawings.

BRIEF DESCRIPTION OF THE DRAWINGS

FIG. 4 shows a longitudinal section of a modified reactor;

FIG. 4a shows an enlarged view of the bottom end of the reactor vessel in FIG. 4;

DETAILED DESCRIPTION OF THE PREFERRED EMBODIMENTS

Figure 1:
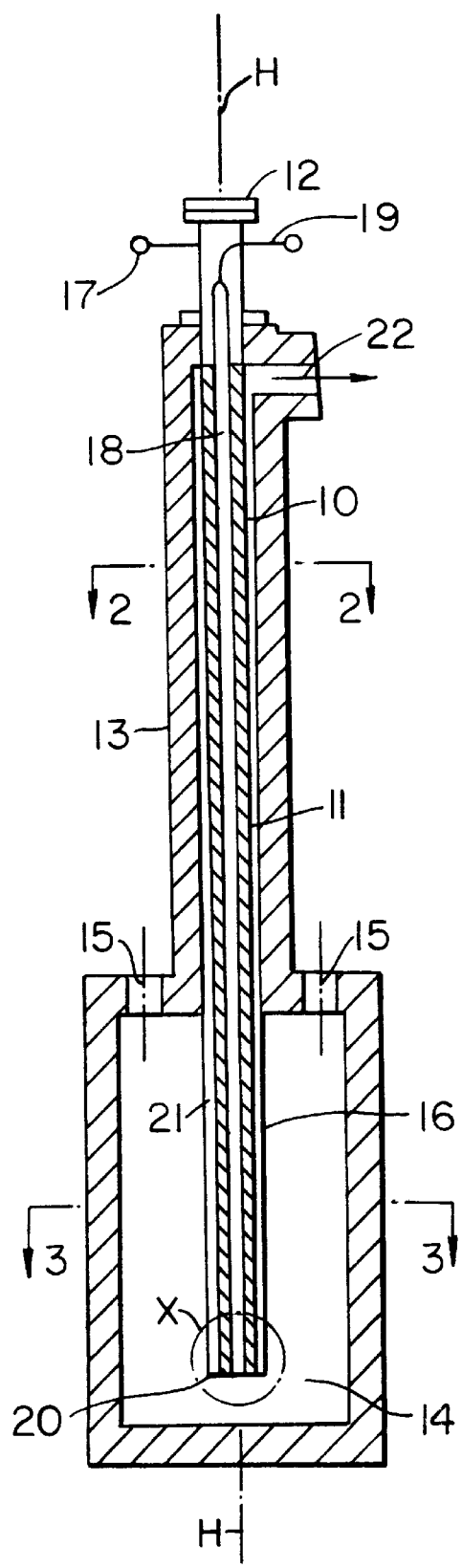
FIG. 1 shows a longitudinal section through a reactor according to the invention.
Figure 2:
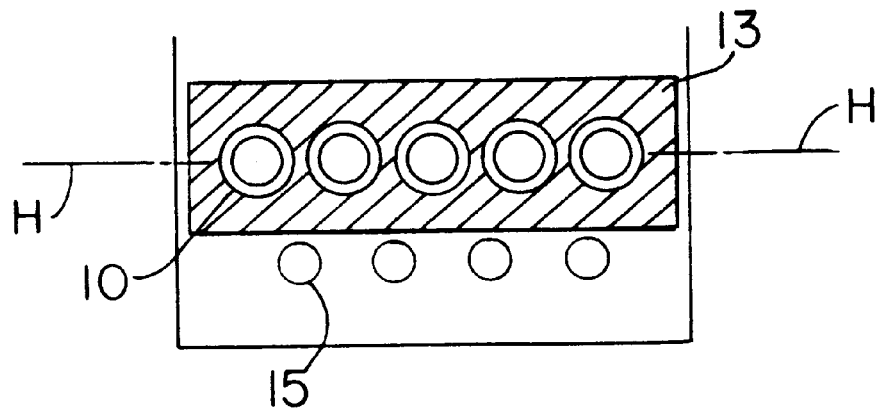
FIG. 2 shows a cross section along the line A—A in FIG. 1.
Figure 3:
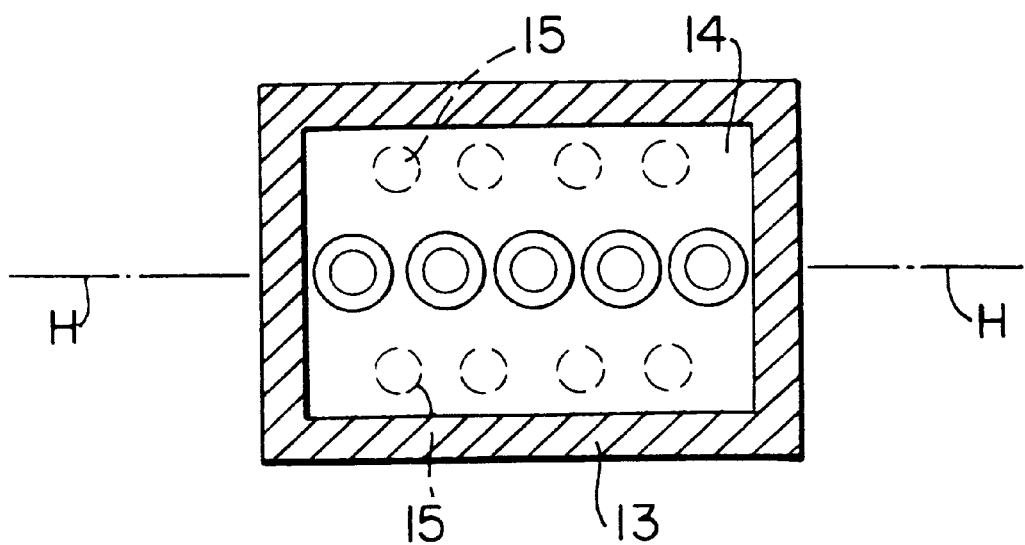
FIG. 3 shows cross section along the line B—B in FIG. 1.

In the catalytic reactor which is shown in different sections in FIGS. 1 to 3, a total of five tubular catalytic vessels 10 are arranged parallel to one another in the vertical longitudinal direction. Their longitudinal axes lie in a common plane H. The catalytic vessels 10 are preferably equidistant with respect to the directly adjacent catalytic vessels 10 (FIG. 3). A row of four burners 15 is arranged, in each instance, on both sides of the plane H at a distance from the catalytic vessels 10, these burners 15 being spaced from one another in the same way as the catalytic vessels 10. The longitudinal axes of the burners 15 are offset with respect to the longitudinal axes of the catalytic vessels 10 so that the burners 15 of the two rows of burners are advantageously located opposite one another in the region of the intermediate space adjacent catalytic vessels 10.

Arrangements of burners 15 and catalytic vessels 10 other than the mirror-symmetrical arrangement can also be selected. For example, the rows of burners can be positioned concentrically in and around a circular arrangement of the catalytic vessels 10, which would also result in a symmetrical arrangement. A less uniformly ordered distribution of the burners 15 and catalytic vessels 10 would also be possible in principle. However, the symmetrical arrangement has considerable advantages with regard to the most uniform possible thermal effect.

The burners are preferably oriented vertically with respect to their flame direction, specifically so as to be directed from top to bottom. It would also be possible in principle to arrange the burners diagonally to the longitudinal axis of the catalytic vessels 10 or even at right angles from the side thereof, although the parallel arrangement is preferable because of the more uniform temperature distribution. In a further embodiment of the invention, a plurality of rows of catalytic vessels 10 arranged parallel to one another so as to alternate with the rows of burners could also be provided instead of a single row. In this way, it is possible to adapt to the required reactor capacity in virtually any manner desired without having to alter the construction of the individual catalytic vessels 10.

As is shown by the longitudinal section in FIG. 1, the reactor according to the invention, which is shown by way of example, has a housing 13 which is formed of refractory material. The lower portion of the housing 13 widens to form a radiation chamber 14 which receives the burners 15 in wall openings in its roof The catalytic vessels 10, only one of which is shown in longitudinal section, penetrate into the radiation chamber 14 from above by approximately one third of their length. Every catalytic vessel 10 has a product gas feed line 17 for the input material which is to be catalytically converted. In this example, the product gas feed line 17 is arranged laterally at the upper end of the housing 13. Since an ascending pipe 18 which extends practically along the entire axial length of the catalytic vessel 10 is installed concentrically in the catalytic vessel 10 in each instance, the product gas outlet line 19 through which the products generated in the catalytic reaction are removed can likewise be arranged laterally in the upper part of the catalytic vessel 10. This has the advantage that each of the catalytic vessels 10 can be fitted at their upper end in the housing 13 so as to be freely suspended. Since a sufficiently large distance is allowed for between the bottom end of the catalytic vessel 10 and the base of the housing 13 in the nonoperational state, the catalytic vessels 10 can expand freely downward in the operating state when heated. If the product gas outlet line 19 were to be connected to the end of the catalytic vessel 10 located opposite the process gas feed line 17, costly design steps would have to be undertaken to compensate for thermal expansion so as to prevent damage to the pipelines.

Figure 1A:
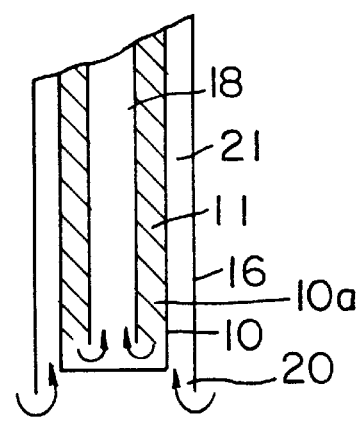
FIG. 1a shows detail X in FIG. 1.

Since the process gas feed line 17 and the product gas outlet line 19 are not arranged at the extreme upper end of the catalytic vessel 10, but rather slightly below it, the upper end face could be provided with an easily accessible, removable cover 12 through which the catalytic material can be introduced and exchanged when required. The catalytic vessels 10 are enclosed along their entire length penetrating into the radiation chamber 14 by a tubular heat distributor 16 which is formed of a material with good heat conducting properties, preferably a heat-resistant steel, so that an annular gap 21 is formed between the wall of the catalytic vessel 10 and the heat distributor 16. This is shown more clearly in FIG. 1a, which shows a detailed enlargement of detail X from FIG. 1. It can be seen that the catalytic vessel 10 is tightly closed at its lower end side by a base. The product gas flowing downward through the catalytic mass 10a located in the annular chamber 11 is deflected in the region of the end side and can flow through an annular through-gap into the ascending pipe 18 and can be extracted at the top. This gap passage is formed in that the ascending pipe 18 ends at a short distance from the base of the catalytic vessel 10. The product gas outlet line 19 is connected with the ascending pipe 18 (FIG. 1) and guided out through the wall of the catalytic vessel 10. The tubular heat distributors 16 are fitted to the roof of the radiation chamber 14. The length of the heat distributors 16 is so dimensioned that a sufficiently large distance is maintained between the base of the housing 13 and the end side of the heat distributor 16 while taking into account the thermal longitudinal expansion during operation, so that the hot combustion gas can flow upward into the annular gap 21 between the heat distributor 16 and the catalytic vessel 10 via the entrance gap 20. In many cases, it is advisable to provide slots in the wall of the heat distributors 16 so that the combustion gases can enter the gap 21. This has the advantage that the flow conditions of the combustion gases can be adjusted in a directed manner exclusively by the selection of the quantity and dimensions of these slots without having to change the external geometry of the heat distributors 16 and catalytic vessels 10.

The heat needed for the endothermic reaction is fed to the process gas flowing through the catalytic vessel 10 from the partial flow of the combustion gases entering through the gap 21. However, since the heat distributor 16 conducts heat, this combustion gas flow, at the same time that it gives off its heat, absorbs heat again from the radiation chamber 14 through the wall of the heat distributor 16 so that it retains virtually the same temperature until reaching the height of the roof of the radiation chamber 14. But this temperature lies substantially below the adiabatic flame temperature, since heat is constantly given off to the process gas for the endothermic catalytic reaction during combustion.

Above the roof of the radiation chamber 14, the catalytic vessels 10 are enclosed at a slight distance by the refractory material of the housing 13 similarly to the manner in which they are enclosed by the heat distributor 16 so that the gap 21 is continued upward. Of course, it would also be possible to continue the heat distributors 16 until the upper end of the housing 13 and to arrange the housing wall only around the upper portion of the heat distributors. In the upper portion of the catalytic vessel 10, i.e., along approximately ⅔ of its length in the example shown in FIG. 1, the temperature of the combustion gases drops continuously due to the constant delivery of heat and the absence of any possibility of absorbing heat. The cooled combustion gas leaves the reactor through the flue gas outlet line 22 and can be reused in a convection portion of a more complex overall installation, not shown.

FIGS. 4 and 4a show a modified embodiment form of the reactor according to the invention. Parts performing functions identical to those shown in FIGS. 1 to 3 are provided with the same reference numbers and need not be discussed again. In contrast to the first embodiment example, this reactor has a helical baffle 24 within the annular gap 21, this baffle 24 displacing the through-flowing combustion gas flow in an additional rotational movement about the longitudinal axis of the distribution is achieved in a particularly uniform temperature distribution is achieved in the heating of the reactor due to the helical overall movement of the combustion gas flow which is brought about in this way.

The lower end of the catalytic vessel 10 with the heat distributor 16 is shown as an enlarged detail in FIG. 4a. As in FIG. 4, an installation, which acts as a heat exchange promoter 23 and is constructed in the form of a preferably tubular flow displacement body which extends coaxially substantially over the entire length of the ascending pipe 18, is arranged in the ascending pipe 18. The outer diameter of the heat exchange promoter 23 is smaller than the inner diameter of the ascending pipe 18 so that an annular space 25 is formed between the two diameters. The tubular body of the heat exchange promoter 23 is tightly sealed on the inside (e.g., in the lower portion) so that the product gas formed by catalysis can only flow up through this annular space 25 to the product gas outlet line 19 after leaving the annular chamber 11 which is filled with the catalytic material. In this way, the product gas is compelled to an intimate heat exchange with the downward flowing process gas to be heated, which is effected through the wall of the ascending pipe 18. Of course, a flow displacement body formed of solid material could also be used instead of a tubular heat exchange promoter 23.

Figure 5:
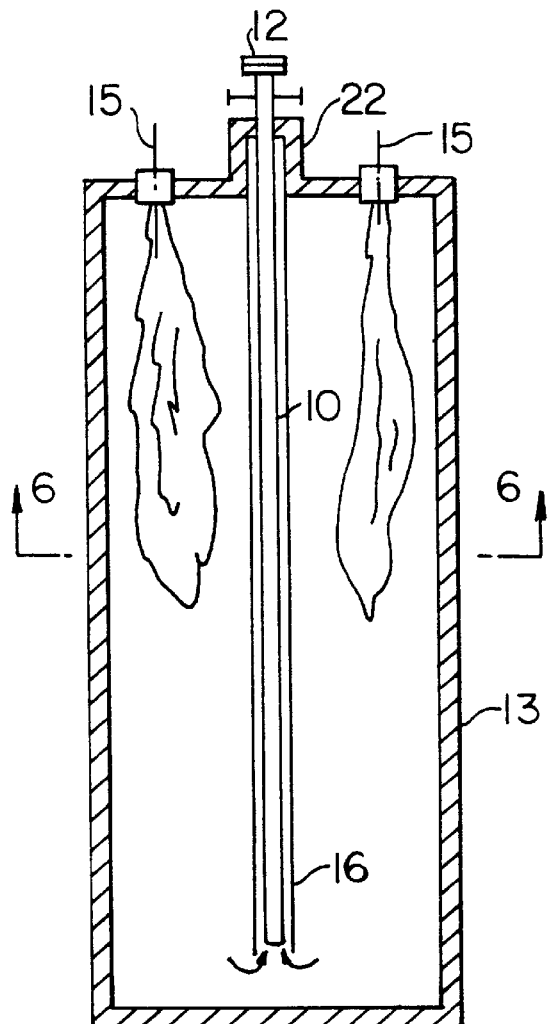
FIG. 5 shows a longitudinal section through an isothermal reactor according to the invention.
Figure 6:
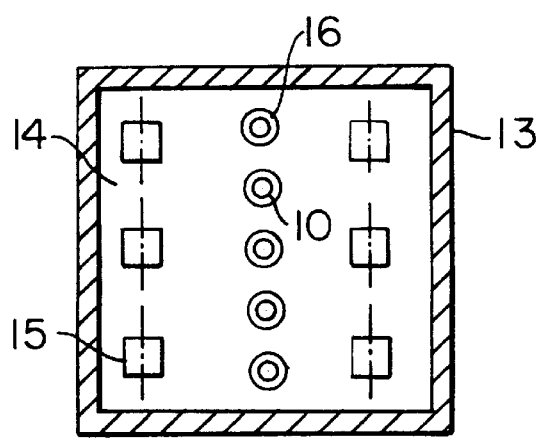
FIG. 6 shows cross section along the line C—C in FIG. 5.
Figure 7:
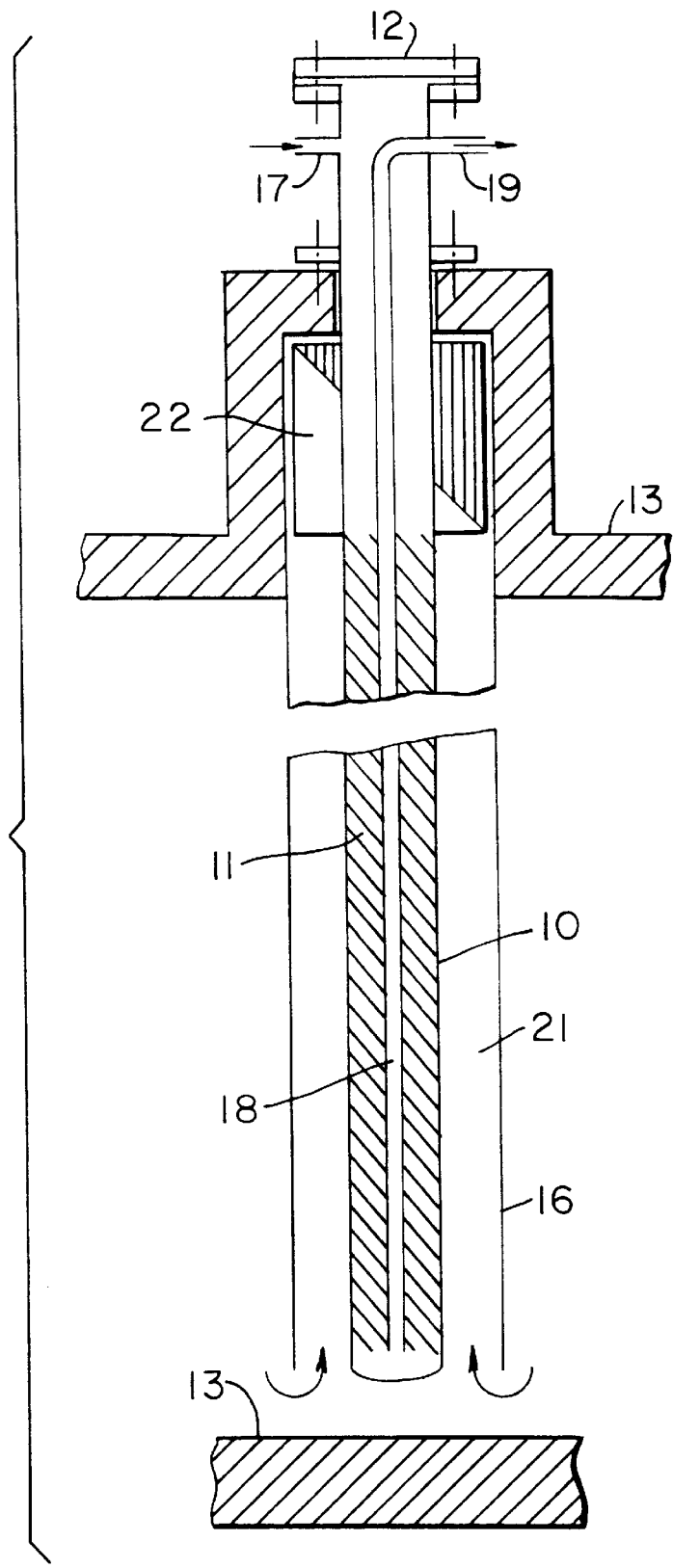
FIG. 7 shows an enlarged detail section of the reactor in FIG. 5.

FIGS. 5 to 7 show another embodiment of the invention, the construction of the housing 13 and the arrangement of the burners 15 and catalytic vessels 10 being shown schematically in FIGS. 5 and 6, while FIG. 7 shows a more detailed view of the catalytic vessel 10. Again, parts having the same function are provided with identical reference numbers. This embodiment differs from the first embodiment in that the radiation chamber 14 practically occupies the entire housing 13 and the heat distributors 16 extend in each instance substantially along the entire axial length of the catalytic vessels 10. In this way, the combustion gas flowing upward through the gap 21 can give off heat to the process gas along its entire path and can absorb heat at the same time through the wall of the heat distributor 16 so that its temperature is maintained practically constant along this path. An isothermal catalytic reactor is formed in this way. Consequently, the product gas flowing upward through the ascending pipe 18 has the same temperature as the process gas flowing downward through the annular space 11 so that there is no transfer of heat between these two gas flows. The installation of a flow displacement body in the ascending pipe can therefore be omitted.

A particular advantage of the invention consists in that the output of a catalytic reactor can be changed within wide limits in the planning stage simply as a result of the quantity of catalytic vessels 10 and burners 15 without changing the individual catalytic vessels 10. As a result of the nonadiabatic combustion, the flame temperatures are appreciably reduced so that no complicated and accordingly expensive refractory constructions are required. Further, the thermal loading of the tubular heat distributor remains comparatively low.

A construction corresponding to the embodiment forms in FIGS. 1 to 4 is suitable particularly for the steam reformation of hydrocarbons, while an isothermal reactor such as that shown in FIGS. 5 to 7, is advantageous particularly for dehydrogenation processes such as those mentioned previously.

What is claimed is:

1. A catalytic reactor for endothermic reactions, comprising:

a housing formed of refractory material and defining an interior that is heatable by combustion gases;

a flue gas outlet line connected to the housing to guide out the combustion gases;

a plurality of tubular catalytic vessels arranged at a distance from one another in the interior of the housing, the catalytic vessels having a bottom end that is sealed by a base, and further comprising, for each catalytic vessel, an ascending pipe arranged within the vessel coaxial to the longitudinal axis of the vessel and substantially along the entire axial length of the vessel so as to end at a distance from the base to form a through-gap and so as to form an annular space between the ascending pipe and an outer wall of the catalytic vessel, a catalytic material being arranged within the annular space;

a process gas feed line connected to the catalytic vessels to feed in material to be catalytically processed;

a product gas outlet line connected to a top end of the ascending pipe for guiding out a product formed by catalytic reaction;

a plurality of tubular heat distributors, each of the tubular heat distributors being respectively arranged to enclose one of the catalytic vessels over at least a portion of its axial length so as to form an annular gap between the respective heat distributor and catalytic vessel which allows passage of the combustion gases; and a plurality of burners arranged in the housing so that the catalytic vessels are situated between the burners, the burners having a flame region in the vicinity of the heat distributors so as to ensure non-adiabatic combustion.

2. A reactor according to claim 1, wherein the catalytic vessels are arranged vertically and substantially parallel to one another so that directly adjacent catalytic vessels are spaced equidistantly, the burners being arranged symmetrically with respect to the catalytic vessels.

3. A reactor according to claim 2, wherein at least some of the catalytic vessel are arranged so that longitudinal axes thereof lie in a common plane, the burners associated with the aligned catalytic vessels being arranged adjacent to one another in two rows in a mirror-symmetrical manner with respect to the plane of the longitudinal axes of the catalytic vessels.

4. A rector according to claim 2, wherein the burners are arranged to have a vertical flame direction.

5. A reactor according to claim 4, wherein the burners are configured to have a downwardly directed flame direction.

6. A reactor according to claim 3, wherein the catalytic vessels and burners are arranged alternately in a plurality of parallel adjacent rows.

7. A reactor according to claim 3, wherein the burners associated with a row of catalytic vessels are arranged so that longitudinal axes of the burners are offset with respect to the longitudinal axes of the catalytic vessels so that a burner of a first row of burners is respectively located opposite a burner of a second row of burners in an intermediate space formed between adjacent catalytic vessels.

8. A reactor according to claim 1, wherein the heat distributors are configured and arranged to extend substantially along the entire axial length of the catalytic vessels so as to form an isothermal reactor.

9. A reactor according to claim 1, wherein the heat distributors extend over only a lower portion of the catalytic vessels, the housing being configured to enclose the catalytic vessels along a remaining portion of their axial length and to form a continuation of the annular gap.

10. A reactor according to claim 1, and further comprising a helical baffle arranged in the annular gap so as to displace the combustion gas flowing through the annular gap into a helical flow pattern that rotates externally about the respective catalytic vessel.

11. A reactor according to claim 1, and further comprising a heat exchange promotor arranged in the ascending pipe to extend coaxially substantially along the entire length of the ascending pipe so as to form a second annular space between the heat exchange promotor and the ascending pipe, through which second annular space the product gas flows upwardly.

12. A reactor according to claim 11, wherein the heat exchange promotor is a tubular flow displacement body.

13. A reactor according to claim 1, and further comprising a cover arranged in an upper end of each catalytic vessel, the cover being configured to permit introduction of the catalytic material into the catalytic vessel, the process gas feedline and the product gas outlet line being arranged to extend laterally from an upper portion of the catalytic vessel below the cover.

14. A reactor according to claim 1, wherein the housing has a bottom, the catalytic vessels and the heat distributors being connected to an upper part of the housing so as to be freely suspended so that lower ends of the catalytic vessels and heat distributors are at a distance from the bottom of the housing and so that a free suspension is insured which allows for thermal longitudinal expansion during operation and so that an entrance gap formed between each of the heat distributors and the respective catalytic vessel, remains open which permits the combustion gases to flow into the annular gap.

15. A reactor according to claim 1, wherein each of the heat distributors has a wall with a slotted lower end which permits the combustion gases to enter into the annular gap.

* * * * *